April 12, 1949.  A. W. PRANCE ET AL  2,466,966
METHOD FOR MAKING DECORATED LAMINATED
ARTICLES WITH CONTOURED SURFACES
Filed July 7, 1944  2 Sheets-Sheet 1
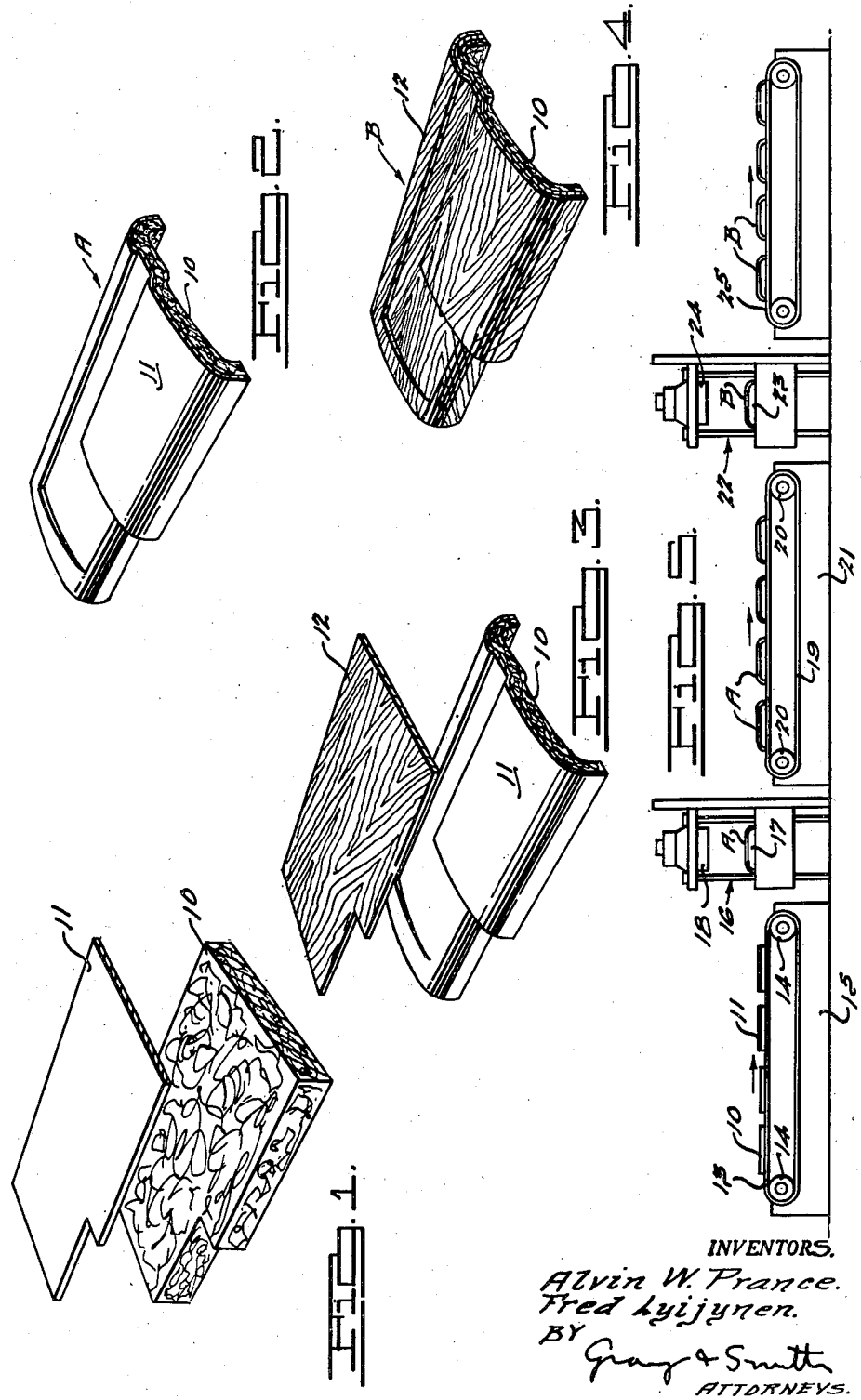
INVENTORS.
Alvin W. Prance.
Fred Lyijynen.
BY
ATTORNEYS.

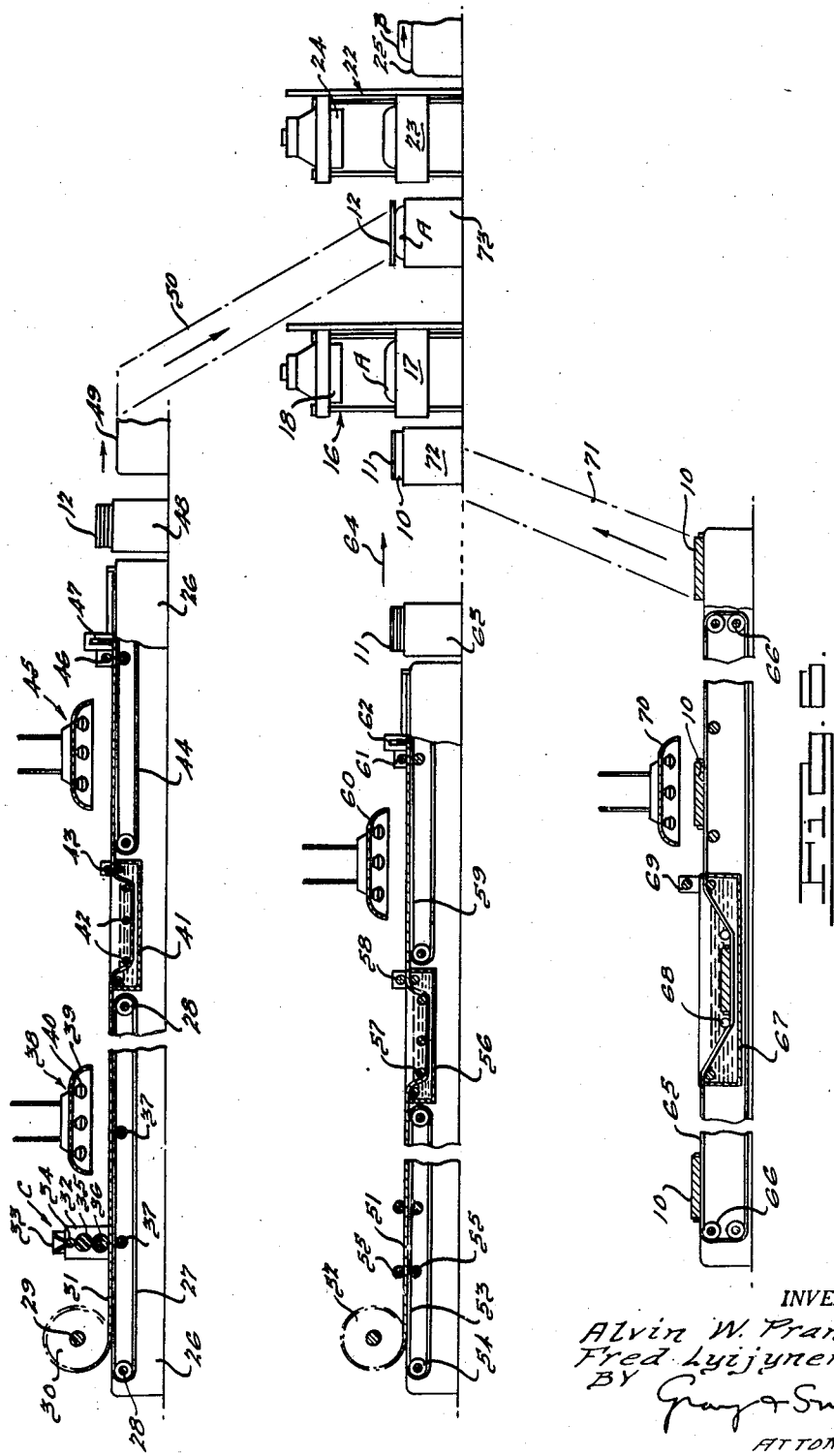

Patented Apr. 12, 1949

2,466,966

UNITED STATES PATENT OFFICE 2,466,966

METHOD FOR MAKING DECORATED LAMINATED ARTICLES WITH CONTOURED SURFACES

Alvin W. Prance, Royal Oak, and Fred Lyljynen, Detroit, Mich., assignors to Briggs Manufacturing Company, a corporation of Michigan Application July 7, 1944, Serial No. 543,852

5 Claims. (Cl. 154—110)

This invention relates to the fabrication of plastic articles and particularly articles prepared from materials in which the principal constituent is a resinous composition or substance of the thermosetting type, an important object of the invention being to produce an article from plastic materials carrying any predetermined design or pattern which will be permanent in nature, will remain relatively undistorted during forming operations, and will not readily become defaced or marred during use of the article.

In the manufacture of articles from sheet material containing a thermosetting resinous substance it has been the practice to form the sheet or blank into the desired shape by the application of heat and pressure, this being usually accomplished in a press having heated die members or platens. The resinous sheet or blank is introduced into the press when in an intermediate stage of polymerization and as the blank is shaped to form in the press it is heated to a temperature and during a period of time sufficient to complete the polymerization of the resin. In the fabrication of articles in this manner from resinous materials, it becomes frequently desirable to impart or apply to the surface of the article a design or ornamental pattern so as to enhance its appearance. It is usually desirable that the design or pattern be in color and it may take any form. As an illustration it may be desirable to produce an article, such as a panel, carrying an imitation wood graining pattern. In the present embodiment of the invention such a pattern is produced on the articles, although it will be understood that the invention is in nowise limited thereto.

Considerable difficulties have been encountered in producing articles from thermosetting resinous materials, which articles are provided with surface designs or patterns. One principal difficulty lies in maintaining the accuracy of the design, or fidelity of reproduction of a pattern, or distinctness and clarity thereof, on account of the tendency to change, distort or obliterate the design during the forming operations when the printed blanks are subjected to pressure and heat, causing flow of the resin and polymerization thereof. Thus, where the resinous blank or sheet material is printed with the desired design or pattern and thereafter formed under heat and pressure, it frequently happens that the flow of resin will disturb the inked pattern and change, smudge or distort it and, in many instances, nearly obliterate it or at least render the pattern indistinct and of little ornamental value.

Another serious difficulty has been encountered in the use of a foundation sheet or blank having considerable bulk or thickness due to the necessity of providing a finished article of adequate strength. When a relatively thick flat blank or pad, reinforced with fibrous material and carrying an inked design or pattern, is formed in a press under heat and pressure in order to shape the blank and polymerize the resin with which the pad is impregnated, the design or pattern frequently becomes distorted or blurred, thereby impairing the appearance of the article. Moreover, where the inked design is carried by a separate relatively thin resin impregnated blank and a second thin blank, impregnated with resin, is interposed between the fibrous foundation blank or pad and the top sheet or blank carrying the design, and these three superimposed sheets or blanks are formed in the flat, difficulties are experienced due to frequent tears or ruptures occurring during the forming operation. Also it has been found that the design or pattern often becomes blurred or distorted.

Another problem encountered with plastic articles carrying an inked pattern or design, resides in the fact that after usage of the article the design becomes marred, defaced or partially worn off, impairing the appearance of the article. One suggestion to overcome this difficulty has been to apply a thin coating or film of lacquer to the surface of the finally formed article. This has proved undesirable since the lacquer film readily wears off and does not materially protect the inked design or pattern against scratching or marring. Another suggestion has been to print the surface of the resinous blank and by heat and pressure forcing the resin, which must be of a transparent or clear nature, around and over the inked pattern to provide a layer of the resin covering the printing. This proposal, however, has encountered the difficulty of preventing the resin flowing to the surface around the inked pattern from distorting or disturbing the pattern since the resin, as it flows through and around the pattern, will dislodge and carry portions of the ink of the pattern with it. Avoidance of this difficulty, if possible, requires exceedingly precise and exact controls raising barriers to large scale production.

An object of the present invention is to eliminate the above mentioned difficulties or minimize them to an important extent so that articles of the kind herein contemplated may be produced with greater accuracy and permanency in respect to the patterns or designs carried thereby.

A further important object of this invention is to provide a method and apparatus by which an improved plastic article of adequate structural strength may be produced by forming or drawing operations and in which the article carries an inked design or pattern of superior character, fidelity and wear resisting properties.

Another object is to provide an article containing a thermo-plastic or thermo-setting resinous material as a principal constituent, the article being produced by first pre-forming a fibrous reinforced foundation sheet or pad, impregnated with the plastic material, to approximate shape and thereafter combining one or more top sheets or blanks with this preformed sheet under heat and pressure in order to produce the finally shaped article, the top sheet or blank preferably carrying an inked design or pattern which during the final forming operation is maintained with considerable accuracy.

A still further object of the invention is to provide an improved process of producing a plastic article carrying an inked design or pattern, the process preferably consisting in pre-forming to approximate final shape a reinforcing or foundation sheet or blank impregnated with the resinous or plastic material, superimposing upon such preformed blank a relatively thin blank or sheet carrying an inked design or pattern and also preferably impregnated with a resinous or plastic material, and consolidating the superimposed sheets intimately together by finally forming them as a unit under suitable pressure and preferably heat so as to produce the article of desired shape or contour having adequate strength and carrying a design or pattern reproduced with considerable faithfulness from the original.

A further object of the invention is to provide a method and apparatus whereby the printed or inked pattern on the article will not become appreciably distorted or impaired during the forming operation under heat and pressure.

Another object of the invention is to provide an improved method and apparatus in which a thermosetting resinous article may be produced, carrying an inked or printed design or pattern which will be completely buried or enveloped in the surface resin while at the same time being maintained more nearly free of distortion or disturbance as a result of flowing of the resin during the forming operation.

Still a further object of the invention is to provide an improved method and apparatus for forming a thermosetting resinous article carrying a printed design, characterized by the fact that the design is substantially fixed in position against disturbance or distortion during the forming operation when the resin is brought to a final stage of reaction or polymerization.

Other objects of this invention will appear in the following description and appended claims, reference being had to the accompanying drawings forming a part of this specification wherein like reference characters designate corresponding parts in the several views.

Figs. 1, 2, 3 and 4 are fragmentary perspective views illustrating in sequence the formation of a composite article in accordance with the present invention which article is produced from a fibrous foundation sheet or pad impregnated with a resinous or other plastic material and which carries an inked pattern or design such as wood graining as illustrated.

Fig. 5 is a diagrammatic view illustrating an apparatus for carrying out the sequence of steps in the formation of the article as illustrated in Figs. 1 to 4 inclusive.

Fig. 6 is a diagrammatic view, partly in section and partly broken away, illustrating three forms of apparatus which cooperate together in carrying out in sequence the various steps of the method or process preferably used in producing a composite article such as that illustrated in Fig. 4.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In Figs. 1 to 5 inclusive we have illustrated, by way of example, a preferred method of forming an instrument panel or molding which carries an inked design or pattern, such as a wood grain pattern. The article is of composite construction comprising a foundation sheet or pad 10 which is preferably composed of fibrous material, such as sisal, hemp or the like, producing a structural pad of considerable bulk made up of a mass of relatively coarse interlocking fibers. The pad 10 is impregnated or saturated with a resinous varnish, preferably formed from a thermo-setting resin which may be of the phenol formaldehyde, urea formaldehyde, melamine, or other suitable type adapted to set and fully polymerize under heat and pressure. According to the preferred practice the impregnated fibrous sheet or blank 10, after drying, is preferably composed of approximately 20 to 40% of thermo-setting resin by weight and the thickness of the pad or blank 10 will be governed by the structural strength required in the final article. In the illustrated example the article also comprises an intermediate sheet or blank 11 and a top sheet 12, the latter carrying the inked design or pattern. The intermediate sheet or blank 11 may be formed of cellulose material, such as white wood pulp, and is preferably relatively thin as compared with the foundation sheet or pad 10. The blank 11, which may have a thickness of approximately .030 to .090 of an inch, is impregnated with a thermo-setting resin of any suitable type similar to or compatible with the resin incorporated in the pad 10. The top sheet 12 may be similar in thickness and material to the sheet 11, such as a white wood pulp paper or other fine grain cellulose material, and to this top sheet is applied an inked pattern or design such as wood graining. After the inked design or pattern is dried the top sheet 12 is impregnated with a thermo-setting resin of any suitable type similar to or compatible with the resin incorporated in the other sheets.

As illustrated in Figs. 1 to 5 inclusive the foundation sheet 10 and the intermediate sheet 11, after blanking to size and shape and after impregnation and drying thereof, are assembled together on a suitable endless conveyor belt 13 traveling over guide rollers 14 mounted upon a supporting frame 15. The assembled sheets 10 and 11 are conveyed to a press 16 having lower and upper heated dies 17 and 18. The superimposed sheets or blanks 10 and 11 are preformed in the press to the approximate final shape of the article. During the preforming operation in the press 16 the resin constituents of the sheets are partially polymerized thereby providing an article A, such as illustrated in Fig. 2, in which the bulk factor or thickness of the foundation sheet 10 has been materially reduced and the sheets 10 and 11 consolidated together by the flow of the resinous material from one sheet into the other thereby producing an intimate substantially homogeneous bond or union thereof. Where the foundation sheet is formed of fibrous material, such as sisal, having considerable thickness or bulk, it is preferred that the foundation sheet and intermediate sheet be preformed simultaneously, since the preliminary shaping of the article in the press 16 and the partial reduction in the thickness of the foundation sheet can be accomplished without danger of rupturing or fracturing the preformed article A. Where the foundation sheet is less bulky and is in the form of a boardlike material in which the fibers have been initially compressed, thereby having less thickness or bulk than the sheet or pad 10, we prefer to preform the foundation sheet in the press 16 to the approximate shape of the final article and thereafter combine the preformed foundation sheet with the intermediate and top sheets in the final molding forming operation.

The preformed article A is removed from the press 16 and transferred to an endless conveyor belt 19 traveling over guide rollers 20 carried by a suitable frame 21. This conveyor conveys the preformed articles A to a press 22 having lower and upper heat dies 23 and 24 capable of completing the polymerization or final setting of the resinous or other plastic content of the article. The sheet or blank 12, carrying the inked design or pattern, is placed upon the composite article A in the press 22, and in the operation of this press the finally formed article B is produced under heat and pressure. The heated dies 23 and 24 in the final forming operation consolidate the sheets 10, 11, and 12 and also complete the reduction in the thickness of the foundation sheet. The resin of the sheets during the final forming operation flows together and produces a homogeneous structure in which the sheets are intimately bonded together. The intermediate sheet 11 may be colorless or dyed to any desired color, and since this sheet is interposed between the top sheet 12 and the foundation sheet it gives depth to the color of the inked design or pattern on the top sheet and at the same time prevents the fibers of the foundation sheet from showing through the top sheet. The finally formed article B may be removed after the forming operation from the press 22 and transferred by an endless conveyor 25 to a place of storage or other station for succeeding operations.

In accordance with the foregoing method it is possible to produce a composite article by forming operations which will be free of distortion, ruptures or fractures, which will have considerable structural strength and in which the design or pattern carried by the article will be maintained with considerable accuracy as to fidelity of detail and reproduction.

Referring to Fig. 6, the apparatus therein illustrated, by way of example, is adapted to be utilized for the purpose of carrying out the various steps in the preparation of sheets 10, 11 and 12 before the preform operation in the press 16 and the final forming of the article in the press 22.

The apparatus for preparing the top sheet 12 comprises spaced longitudinally extending side frames 26 supported upon a suitable base or bed. An endless conveyor belt 27 travels between the side frames and is supported at opposite ends upon suitable guide rollers 28 extending between and carried by the side frames 26, the conveyor belt being driven in any suitable manner at proper speed. Supported at the front end of the conveyor by shaft 29 is a roll 30 of sheet material 31 to be treated in accordance with the present invention. The sheet 31 is of cellulose material and is preferably a white wood pulp paper. As an example of a suitable sheet material to be treated we may use Alpha bleached sulfite wood pulp paper. The sheet material 31 is fed from the roll 30 onto the conveyor 27 and thence to a printing unit C adapted to apply a suitable design or pattern continuously on the upper surface of the sheet as it is fed forwardly on the conveyor. This printing unit is carried by spaced upright side frames 32 and may comprise a conventional set of offset printing rolls. In the present instance the printing unit comprises an ink trough 33 containing the printing ink which is pigmented to provide an ornamental design, such as wood graining, of the desired color. The printing ink is fed from the trough 33 to a rotatable ink feeding roller 34 which in turn transfers the ink by contact to a copper engraved design or printing roller 35. The design roller transfers the inked design to an applicator or transfer roll 36 which may be of the usual gelatin or rubber covered type and which by rolling contact transfers the inked design to the sheet 31 as it travels beneath the roller 36 and over guide rollers 37. It will be understood that the several rollers of the printing unit C may be driven in any suitable manner and that this unit may be of conventional type for applying continuously any desired pattern or design to the moving sheet 31.

After the sheet 31 emerges from the printing unit it travels on the conveyor beneath a drying unit 38 which is adapted to subject the sheet to sufficient penetrating heat to dry the ink of the pattern or design. The drying of the inked pattern may be accomplished in various ways but we prefer to subject the sheet to penetrating heat produced by radiant energy from a source of infra-red rays or electronic heat in order to produce rapid and thorough drying of the inked pattern. The heating unit 38 for accomplishing this purpose comprises a hood or reflector 39 carrying a suitable number of lamps 40 energized to direct infra-red heating rays upon the entire surface of the printed sheet as it travels beneath the unit.

The sheet 31 is conveyed from the heating unit into a tank or container 41 containing a bath of liquid resin varnish. It is preferred that the resin varnish within the tank be clear or substantially colorless where a wood graining pattern is used on the article. The sheet is guided through the tank 41 by means of guide rollers 42 and is completely immersed in the bath of resin varnish so as to apply a coating of the varnish upon opposite sides of the sheet which covers the printed pattern or design and also thoroughly impregnates or saturates the sheet with the resin. Where thermo-setting resin of the type above mentioned is utilized it is preferred that this resin be in an intermediate stage of polymerization. The impregnated sheet passes from the tank 41 through a pair of squeegee rollers 43 which are adapted to remove excess liquid varnish from the surfaces of the sheet.

The sheet passes from the tank 41 onto an endless conveyor 44, similar to the conveyor 27 and driven in timed relation thereto, and while on this conveyor the sheet passes beneath a drying unit 45 which may also be a source of radiant energy, such as infra-red rays, similar to the drying unit 38. From the drying unit 45 the dried sheet is carried by the conveyor 44 beneath a friction pressure roller 46 which in cooperation with the conveyor belt is adapted to grip the sheet material and exert a pulling action thereon effective to assist the feeding action of the conveyor. This roller is driven in any suitable manner and at the proper speed to maintain the sheet taut as it travels on the upper run of the conveyor but without marring or damaging the design or pattern carried by the sheet. The roller 46 also serves the purpose of assisting in feeding the sheet to a shearing or cutting unit 47 which carries a cutting knife or blade adapted to cut the sheet into a succession of blanks 12. The blanks 12 may be stacked upon a table or other support 48 from which station they are transferred to a conveyor, such as indicated at 49, adapted to convey the blanks as indicated by the dot and dash lines 50 to a station where the blanks 12 are assembled with the preformed articles A preparatory to the final forming operation.

The intermediate blanks 11 of the composite articles are formed from a sheet 51 fed from a roll 52 of material preferably similar to the sheet material 31. The sheet 51 is fed from the roll onto an endless conveyor belt 53 supported at opposite ends upon guide rollers 54 and guided by pairs of intermediate rollers 55. As in the case of the conveyor 27 the conveyor 53 is driven in suitable manner and at the proper speed and from this conveyor the sheet 51 is fed into a tank 56 containing a liquid resin varnish preferably similar to or at least compatible with the varnish contained in the tank 41. The sheet is guided through the tank or container 56 by guide rollers 57 and as the resin saturated or impregnated sheet emerges from the tank it passes through a set of squeegee rollers 58 and thence onto an endless conveyor 59. The conveyor 59 is driven in suitable manner and at the proper speed and conveys the resin impregnated sheet 51 beneath a drying unit 60 similar to the unit 38. As the sheet travels beneath the drying unit 60 it is thoroughly dried and from this unit the sheet passes beneath a gripping roller 61 similar to and functioning in the same manner as the roller 46. The sheet is cut into a succession of blanks 11 by a shearing unit 62 which may be similar to the shearing or cutting unit 47. After the blanks 11 have been cut they may be stacked upon a table or support 63.

If it is desired to add color to the intermediate sheets or blanks 11 a suitable pigment may be added to the liquid resin varnish within the tank 56. However, in the present embodiment wherein a wood grain pattern is applied to the article, a colorless resin varnish is used in impregnating or saturating the sheet 51.

The foundation sheet or blank 10 may be prepared by the apparatus shown at the bottom of Fig. 6. The fibrous material used for the foundation of the article may be cut to size and shape producing blanks or pads such as that illustrated in Fig. 1. The blanks 10 are conveyed in succession by an endless conveyor belt 65, supported upon guide rollers 66, into a tank or container 67 carrying a bath of liquid resin varnish preferably similar to or compatible with the resin varnish used in impregnating the sheets 31 and 51. The blanks 10 may be held in place upon the conveyor belt by locating pins or cleats and the belt is guided through the tank 67 by means of laterally spaced guide rollers 68 between which the blanks 10 may pass as the belt travels through the tank. The fibers of the blanks 10 are thoroughly wetted as the blanks pass through the bath within the tank 67 and as the blanks emerge from the tank they may pass between squeegee rollers 69 adapted to remove excess liquid varnish from the surfaces thereof. Thus the blanks or pads 10, forming the foundation or structural portion of the article, are thoroughly impregnated or saturated with liquid resin varnish. From the tank they are fed by the conveyor beneath a drying unit 70 preferably similar to the drying unit 38, and from the conveyor 65 the blanks 10 may be conveyed in succession by any suitable means indicated by the dot and dash lines 71 to a station 72 where the blanks or sheets 10 and 11 are assembled. The assembled sheets or blanks are then placed in the press 16 and preformed, as previously described, to produce the article A which is pressed to approximately the shape of the final article. The preformed articles A are removed from the press 16 and are assembled at station 73 with the top sheet or blank 12 after which the final forming operation is performed in the press 22 in the manner previously described.

Each of the presses 16 and 22 may be of generally conventional construction having lower and upper heated dies or platens, the latter being carried by a vertically reciprocable ram. The presses may be either mechanically operated or hydraulically operated. The dies 17 and 18 of the press 16 cooperate to press the assembled blanks 10 and 11 to approximately final shape while reducing the thickness of the foundation material. Pressure is maintained between dies or platens 17 and 18 a sufficient interval of time to enable the heat from the dies to penetrate the sheets, bringing the resin content to molding temperature and partially polymerizing or carrying forward the reaction of the resin during the preforming operation. The temperature of the preform dies is preferably somewhat less than the temperature of the dies 23 and 24 of the press 22, the latter being heated to a temperature on the order of from 275° F. to 300° F. The article is maintained under pressure between the dies 23 and 24 for a sufficient interval of time to enable the dies to complete the polymerization or reaction of the resin. The preforming operation carried out in the press 16 is preferably accomplished under lower pressures than the final forming operation in the press 22, the pressures in the latter operation ranging preferably from about 250 to 500 pounds per square inch.

The resinous coating which is applied to the sheet 31 over the printed design not only has the advantage of protecting the design or pattern against marring or defacement in use but also stabilizes the inked pattern to the extent of preventing the resin in the body of the sheet from being forced through or around the printing tending to distort or obliterate it while the blanks are being finally formed in the press 22. During the operation of the dies 23 and 24 there is a tendency for the resin in the body of the sheet 12 to flow toward the surface of the sheet. However, by superimposing the clear resinous coating on the printed sheet the design or pattern is, in effect, anchored in place and this coating prevents any appreciable flow of the resin in the sheet through and around the printing and the consequent distortion or blurring thereof. In some instances it may be found desirable to apply a second coating of clear or transparent resin varnish to the sheet 31 after the sheet has emerged from the drying unit 45. In such instance the second coating may be applied by immersing the sheet in a bath of transparent or colorless liquid resin varnish after which the second coating is dried as by means of a drying unit similar to the unit 38 or 45.

In accordance with the foregoing method it is possible to obtain any combination of colors as well as considerable depth to the color of the inked pattern or design. Ordinarily the basic color will be incorporated in the printing ink used in applying the design or pattern to the top sheet 12. Any contrasting color may be incorporated in the article by pigmenting the liquid resin varnish in the tank 56 thus providing the intermediate sheet 11 with a color effect adapted to modify the color of the inked pattern or enhance the depth thereof. We prefer to use a thermo-setting resin as a constituent of the sheets or blanks that are molded together. However, other plastic substances having equivalent properties and adapted to set under heat and pressure may be used. The foundation and intermediate sheets are preferably impregnated so as to contain from twenty to forty per cent of resin by weight and the top sheet preferably contains approximately fifty per cent of resin by weight. These proportions are mentioned by way of example because they have given highly satisfactory results.

We claim:

1. In the method of making a laminated article having a contoured conformation, the steps of consolidating together through the medium of a bonding resin a plurality of sheets by simultaneously preforming said sheets assembled together under heat and pressure to produce a foundation board approximating the shape of the finished article, superimposing upon said preformed foundation board a non-preformed ornamental sheet carrying an inked design coated over with a film of reactive resin varnish, and finally forming the article to its said finished shape by consolidating together under heat and pressure said preformed foundation board and ornamental sheet while completing the reaction of the resin contituents.

2. In the method of making a laminated article having a contoured conformation, the steps of laminating a plurality of foundation sheets with a layer of bonding resin in a reactive stage interposed therebetween, simultaneously pressing said sheets assembled together to preform them into a foundation board having approximately the shape of the final article with said sheets consolidated together, superimposing upon said preformed foundation board a non-preformed printed sheet having a top coating of reactive resin covering the printing thereon, and finally forming and consolidating together under heat and pressure said printed sheet and said preformed foundation board to provide the final article with said shape while completing the reaction of said resins.

3. In the method of making a laminated article having a curvate nonplanar surface, the steps of consolidating together through the medium of a bonding resin a plurality of sheets by simultaneously preforming said sheets assembled together under heat and pressure to produce a foundation board, superimposing upon said foundation board a relatively thinner substantially flat ornamental sheet carrying a printed design coated over with a film of reactive resin, and simultaneously consolidating said preformed foundation board and ornamental sheet while pressing them to substantially the shape of the foundation to form the finished article.

4. In the method of making a laminated article having a curvate nonplanar surface, the steps of consolidating together through the medium of a phenolic bonding resin a plurality of sheets by simultaneously preforming said sheets assembled together under heat and pressure to produce a foundation board approximating or substantially conforming to the final shape of the article, superimposing upon said foundation board a substantially flat relatively thinner ornamental sheet carrying a printed design coated over with a film of reactive phenolic resin, and simultaneously consolidating said preformed foundation board and ornamental sheet while pressing them to the said final shape of the article and applying heat sufficient to complete the reaction of said resins.

5. In the method of making laminated articles having a contoured conformation, the steps of applying a printed design or pattern to a substantially planar cellulosic sheet, drying the same and impregnating the sheet with a liquid resin varnish in such manner as to form a coating of the resin over the design or pattern, superimposing said sheet after drying upon a laminated foundation board pre-shaped under pressure to substantially the final shape of the article, compressing said sheet and pre-shaped foundation board between heated mold members to consolidate the same together and conform the printed sheet to the said final shape of the foundation board.

ALVIN W. PRANCE.
FRED LYIJYNEN.

REFERENCES CITED

The following references are of record in the file of this patent:

UNITED STATES PATENTS

| Number | Name | Date |
| --- | --- | --- |
| 1,454,845 | Clay | May 15, 1923 |
| 1,866,312 | Loetscher | July 5, 1932 |
| 1,867,575 | Loetscher | July 19, 1932 |
| 1,956,314 | Carter | Apr. 24, 1934 |
| 1,997,358 | Cochrane, Jr. | Apr. 9, 1935 |
| 1,997,359 | Cochrane, Jr. | Apr. 9, 1935 |
| 2,118,549 | Cochrane, Jr. | May 24, 1938 |
| 2,275,989 | Perry | Mar. 10, 1942 |
| 2,276,567 | Donaldson | Mar. 17, 1942 |
| 2,311,156 | Casto | Feb. 16, 1943 |